United States Patent
Kurabayashi et al.

(10) Patent No.: US 9,727,847 B2
(45) Date of Patent: Aug. 8, 2017

(54) PEAK-PERFORMANCE-AWARE BILLING FOR CLOUD COMPUTING ENVIRONMENT

(75) Inventors: Shuichi Kurabayashi, Fujisawa (JP); Naofumi Yoshida, Yokohama (JP); Kosuke Takano, Oiso-machi (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 665 days.

(21) Appl. No.: 14/110,442

(22) PCT Filed: Jun. 14, 2011

(86) PCT No.: PCT/US2011/040368
§ 371 (c)(1),
(2), (4) Date: Oct. 8, 2013

(87) PCT Pub. No.: WO2012/173604
PCT Pub. Date: Dec. 20, 2012

(65) Prior Publication Data
US 2014/0032405 A1    Jan. 30, 2014

(51) Int. Cl.
*G06Q 30/02*    (2012.01)
*G06Q 20/10*    (2012.01)
*H04L 12/911*   (2013.01)

(52) U.S. Cl.
CPC .......... *G06Q 20/102* (2013.01); *G06Q 30/02* (2013.01); *H04L 47/70* (2013.01)

(58) Field of Classification Search
CPC ...... G06Q 10/06; G06Q 10/00; G06F 9/5077; G06F 9/5027; H04L 12/4641
(Continued)

(56) References Cited

U.S. PATENT DOCUMENTS

| 7,320,131 B1 | 1/2008 | O'Toole |
| 7,502,655 B2 * | 3/2009 | Albright .................. A01G 7/02 405/37 |

(Continued)

FOREIGN PATENT DOCUMENTS

| CN | 101364899 A | 2/2009 |
| JP | H11331187 A | 11/1999 |

(Continued)

OTHER PUBLICATIONS

Ryota Tamaki, Iaas (Infrastructure as a Service) "The minimum for the lending of servers is one CPU; the main fee scale is a monthly fee; the number of services that allow for immediate changes" is on the increase, Nikkei Computer, Japan, Nikkei Business Publications, Inc., May 26, 2010, No. 757, pp. 109-116, with attached Explanation of Relevance.

(Continued)

*Primary Examiner* — Vanel Frenel
(74) *Attorney, Agent, or Firm* — Brundidge & Stanger, P.C.

(57) ABSTRACT

In some examples, a method is described that may include determining, by a computing device, from a service level agreement (SLA) with a user, an upper limit on computer resources in a cloud computing environment that can be consumed per unit time by at least one application executed for the user in the cloud computing environment. The method may also include charging a fixed cost per period under the SLA.

18 Claims, 5 Drawing Sheets

(58) Field of Classification Search
USPC ............ 705/52, 40; 713/300; 370/254, 389, 370/401; 709/224, 226
See application file for complete search history.

(56) References Cited

U.S. PATENT DOCUMENTS

| | | | |
|---|---|---|---|
| 8,462,632 B1* | 6/2013 | Vincent | H04L 47/25 370/235 |
| 8,762,531 B1* | 6/2014 | Yemini | G06Q 10/06 340/1.1 |
| 2001/0025310 A1* | 9/2001 | Krishnamurthy | G06Q 10/06395 709/223 |
| 2008/0235119 A1 | 9/2008 | Agarwal | |
| 2010/0088205 A1 | 4/2010 | Robertson | |
| 2010/0211492 A1* | 8/2010 | Lund | G06Q 30/0206 705/34 |
| 2011/0035248 A1* | 2/2011 | Juillard | G06F 9/5072 709/226 |
| 2011/0072431 A1 | 3/2011 | Cable et al. | |
| 2011/0099095 A1 | 4/2011 | Moore | |
| 2011/0213712 A1* | 9/2011 | Hadar | G06Q 30/04 705/80 |
| 2011/0296019 A1* | 12/2011 | Ferris | G06F 9/45533 709/226 |
| 2012/0331113 A1* | 12/2012 | Jain | G06F 9/5072 709/220 |
| 2013/0034015 A1* | 2/2013 | Jaiswal | H04L 12/4641 370/254 |
| 2013/0042123 A1* | 2/2013 | Smith | G06F 9/5094 713/300 |
| 2013/0339201 A1* | 12/2013 | Banerjee | G06Q 40/10 705/30 |
| 2015/0229586 A1* | 8/2015 | Jackson | G06F 9/5027 705/40 |

FOREIGN PATENT DOCUMENTS

| | | |
|---|---|---|
| JP | 2001-134452 A | 5/2001 |
| JP | 2001-195267 | 7/2001 |
| JP | 2001-195267 A | 7/2001 |
| JP | 2001-195268 A | 7/2001 |
| JP | 2002-207629 A | 7/2002 |
| JP | 2003179966 A | 6/2003 |
| JP | 2010-152738 A | 7/2010 |
| JP | 2010-176637 | 8/2010 |
| JP | 2010-176637 A | 8/2010 |
| JP | 2010-272052 A | 12/2010 |
| KR | 10-2010-0069538 A | 6/2010 |

OTHER PUBLICATIONS

Yukihisa Yonemochi, "Technic for implementing Cloud" (Cloud Computing), Japan, Impress Corporation, Sep. 1, 2009, first edition, pp. 174-179, with attached Explanation of Relevance.
International Search Report and Written Opinion from corresponding International Application No. PCT/US11/040368 mailed Oct. 21, 2013.
Jäätmaa, J., "Financial Aspects of Cloud Computing Business Models," Information Systems Science, Master's thesis, Aalto University, School of Economics, pp. 1-96 (2010).
"Pricing Peak usage Pay-Per-Use Software Licensing Models in the Cloud (Squall Computing)", by Cris Wendt. 2011.
"Clearing the Air on Cloud Computing" McKinsey & Company, 2009.

* cited by examiner

PEAK-PERFORMANCE-AWARE BILLING FOR CLOUD COMPUTING ENVIRONMENT

CROSS-REFERENCE TO RELATED APPLICATION

The present application is a U.S. National Stage filing under 35 U.S.C. §371 of International Application No. PCT/US2011/040368, filed on Jun. 14, 2011.

BACKGROUND

Unless otherwise indicated herein, the materials described herein are not prior art to the claims in the present application and are not admitted to be prior art by inclusion in this section.

Some cloud computing environments implement usage-based billing based on CPU execution time. For example, in the MICROSOFT WINDOWS AZURE cloud service, the pricing may be $0.05 per hour for an extra small compute instance, $0.12 per hour for a small compute instance, $0.24 per hour for a medium compute instance, $0.48 per hour for a large compute instance, and $0.96 per hour for an extra large compute instance, which may be respectively configured with a single 1 GHz CPU, a single 1.6 GHz CPU, two 1.6 GHz CPUs, four 1.6 GHz CPUs, or eight 1.6 GHz CPUs.

In the case of a data-oriented application, the required CPU execution time may increase or decrease depending on the amount and the nature of the data such that it can be difficult for a developer to estimate the CPU execution time, and therefore the cost, in advance. In the case of a data mining program for extracting preferred customers from a customer information database, for example, the amount of relevant data in the customer information database may be unknown in advance such that the CPU execution time required to mine all the relevant data, and therefore the cost to mine the relevant data, cannot be estimated in advance. Accordingly, while the rate for using a cloud computing environment may be known in advance, the cost is uncertain and/or unknown to the same extent that the usage amount of the cloud computing environment is also uncertain and/or unknown.

SUMMARY

Techniques described herein generally relate to a service level agreement (SLA)-based flat rate pricing model for cloud computing environments.

In some examples, a method is described that may include determining, by a computing device, from an SLA with a user, an upper limit on computer resources in a cloud computing environment that can be consumed per unit time by at least one application executed for the user in the cloud computing environment. The method may also include charging a fixed cost per period under the SLA.

In some examples, a computer storage medium having computer-executable instructions stored thereon that are executable by a computing device to perform operations is described. The operations may include storing an upper limit on computer resources in a cloud computing environment that can be consumed per unit time by at least one application executed for a user in the cloud computer environment. The operations may also include measuring consumption of the computer resources by the at least one application per unit time. The operations may also include determining whether consumption of the computer resources by the at least one application per unit time exceeds the upper limit. The operations may also include, in response to determining that consumption by the at least one application exceeds the upper limit, decreasing an allocation of the computer resources to the at least one application.

In some examples, a back end system of a cloud computing environment is described. The back end system may include an SLA information module including computer-executable instructions that are executable by at least one processing resource to store, in at least one storage resource, an upper limit on computer resources that can be consumed per unit time by at least one application executed for a user in the cloud computing environment. The back end system may also include a resource counter module including computer-executable instructions that are executable by the at least one processing resource to measure consumption of the computer resources by the at least one application per unit time. The back end system may also include a priority controller module including computer-executable instructions that are executable by the at least one processing resource to determine whether consumption of the computer resources by the at least one application per unit time exceeds the upper limit, and, in response to determining that consumption by the at least one application exceeds the upper limit, decrease allocation of the computer resources to the at least one application.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
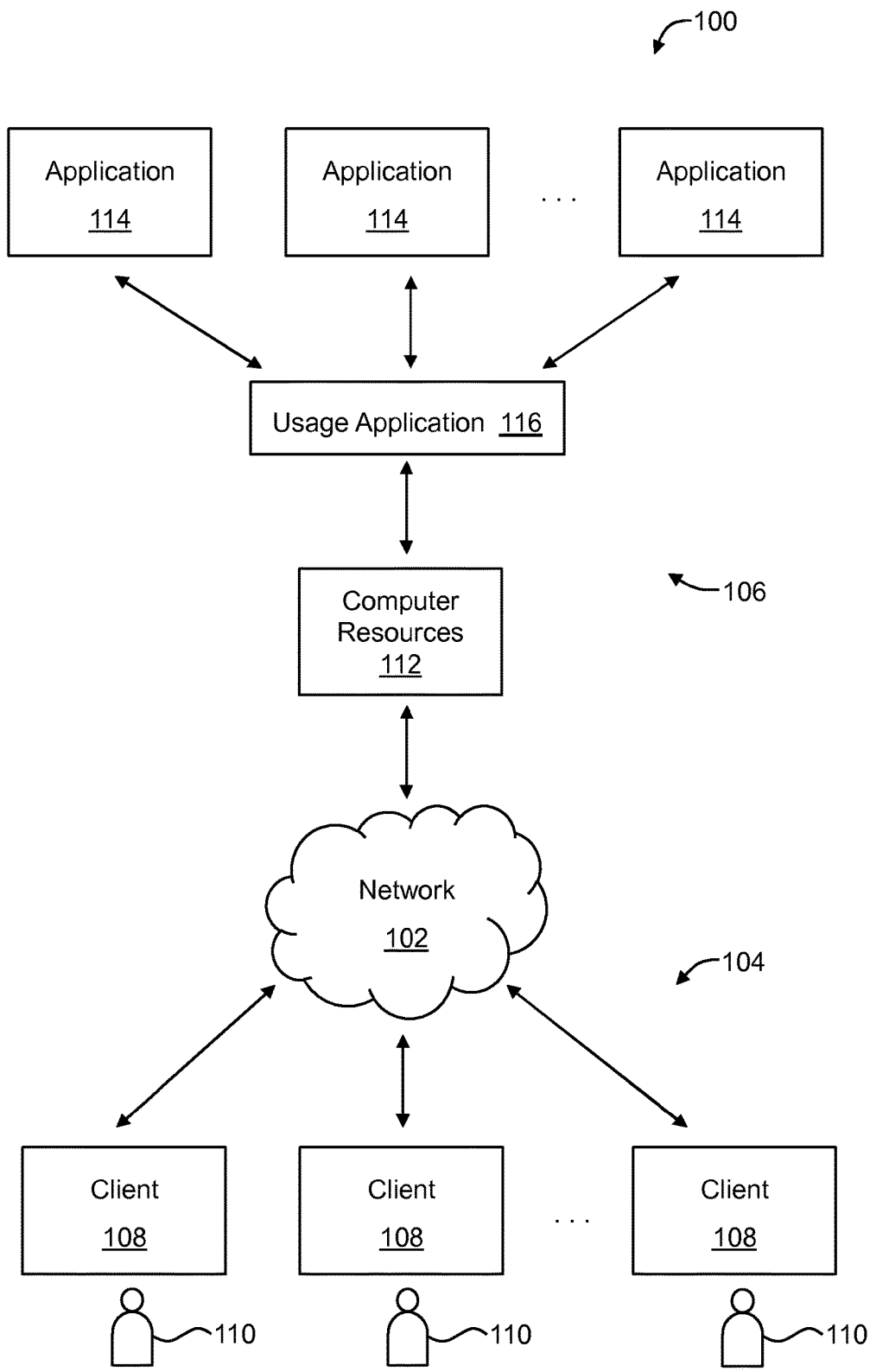
FIG. 1 is a block diagram of an example cloud computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to an SLA-based flat rate pricing model for cloud computing environments. Generally, for example, a user may enter into an SLA with a provider, such as a cloud service provider. The SLA may identify an upper limit on computer resources in the cloud computing environment that may be consumed per unit time by an application, or multiple applications, executed for the user in the cloud computing environment. The SLA may also identify a fixed cost charged per period under the SLA. The upper limit of the SLA may vary with time between relatively higher values when demand for computer resources is expected to be relatively lower and relatively lower values when demand for computer resources is expected to be relatively higher.

When an application is executed in the cloud computing environment for the user, consumption of computer resources by the application may be measured and compared to the upper limit under the SLA. If the peak consumption exceeds the upper limit, allocation of computer resources to the application may be reduced to keep peak consumption below the upper limit. Thus, according to some embodiments, a fixed periodic cost may be charged to the user for any amount of consumption of computer resources below the upper limit by monitoring the peak consumption by the application.

FIG. 1 is a block diagram of an example cloud computing environment 100, arranged in accordance with at least some embodiments described herein. Although not required, the cloud computing environment 100 may include an AMAZON EC2-type cloud computing environment. In the illustrated embodiment, the cloud computing environment 100 includes a network 102, a front end system 104 and a back end system 106.

In general, the network 102 may include one or more wide area networks (WANs) and/or local area networks (LANs) that enable the front end system 104 and the back end system 106 to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The front end system 104 of the cloud computing environment 100 may include one or more client devices 108 and corresponding users 110. Each of the client devices 108 may execute an application (not shown) configured to communicate through the network 102 with the back end system 106. The application executed on each client device 108 to communicate with the back end system 106 may include an internet browser, or other suitable application. Each of the client devices 108 may include, but is not limited to, a desktop computer, a laptop computer, a mobile phone, a smartphone, a personal digital assistant (PDA), or other suitable client device.

The back end system 106 of the cloud computing environment 100 may include the computer resources 112, one or more applications 114 accessible to the users 110, and a usage application 116. By way of example, and not limitation, the computer resources 112 may include processing resources such as one or more central processing units (CPUs), storage resources such as one or more storage devices, other resources such as network interface controllers (NICs) or other communication interface devices, and/or other suitable computer resources.

The applications 114 may include data processing applications, video games, and/or virtually any other application for which cloud-based access may be desired by the users 110. In some embodiments, each application 114 may be executed by a dedicated server including one or more CPUs included in the computer resources 112, while in other embodiments each application 114 may be executed on a virtual server.

The users 110 may broadly include individual users and/or organizations including one or more users. In general, the users 110 may operate the client devices 108 to access the computer resources 112 and the applications 114 included in the back end system 106.

As will be described in greater detail below, the usage application 116 may be configured to, among other things, monitor usage of the computer resources 112 by the applications 114 executed for the users 110.

In some embodiments, each of the users 110 may enter into a service level agreement (SLA) with, e.g., a provider of the back end system 106 and/or another entity. Each SLA may identify an upper limit on the computer resources 112 that can be consumed per unit time by at least one application 114 executed for the corresponding user 110 in the cloud computing environment 100. Each SLA may also identify a fixed cost per period to charge the corresponding user 110 for consumption of the computer resources 112 at or below the corresponding upper limit.

Figure 2A:
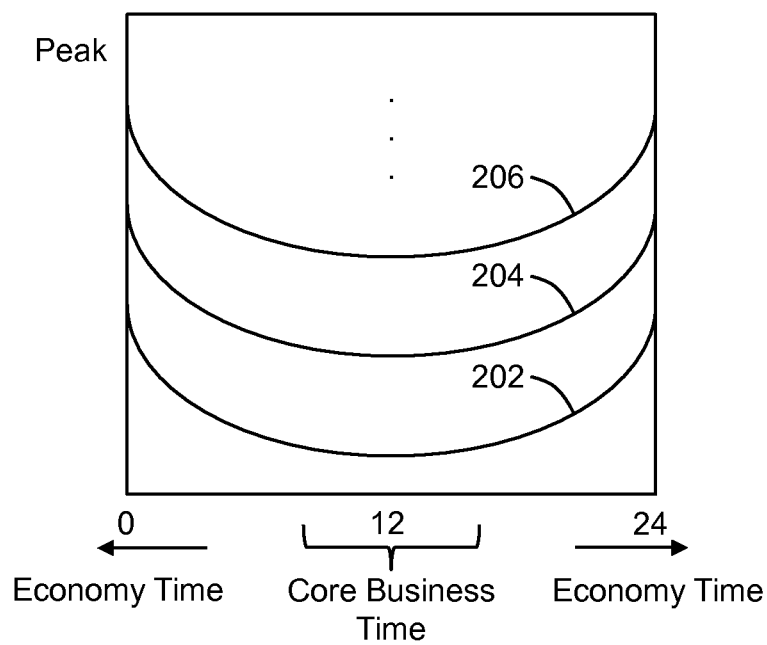
FIGS. 2A-2B are graphs illustrating some example service level agreement (SLA)-based flat rate pricing models.
Figure 2B:
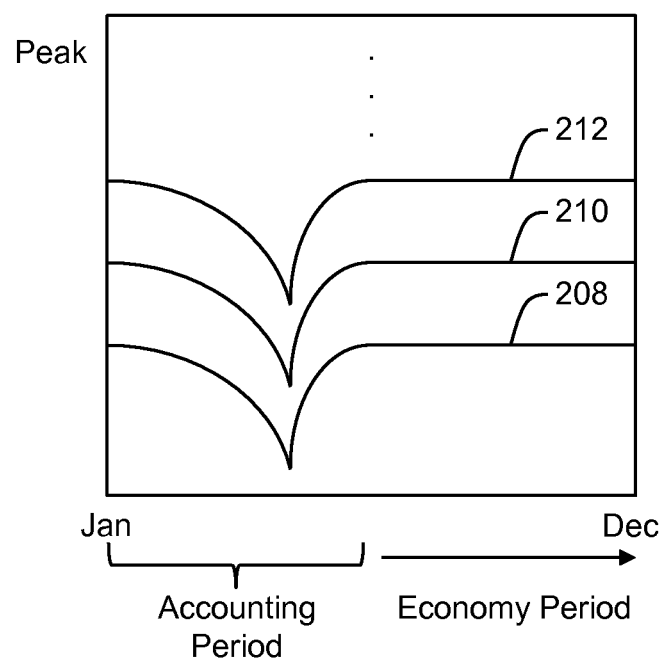

The upper limit for a given SLA may vary with time to both promote usage of the computer resources 112 and to prevent the users 110 from over-using the computer resources 112. In this regard, consider FIGS. 2A-2B. FIGS. 2A-2B are graphs illustrating some example SLA-based flat rate pricing models, arranged in accordance with at least some embodiments described herein.

In the example of FIG. 2A, multiple upper limits 202, 204, 206 are illustrated that correspond to a respective first, second, or third SLA and that vary with time. Specifically, each of the upper limits 202, 204, 206 varies between a relatively lower value that occurs at about noon, e.g., 12 pm each day, and a relatively higher value that occurs at about midnight, e.g., 12 am each day. The relatively lower value of each of the upper limits 202, 204, 206 may occur during a "core business time" such as during typical business hours from about 8 am to about 5 pm when demand for the computer resources 112 may be expected to be relatively higher. The relatively higher value of each of the upper limits 202, 204, 206 may occur during an "economy time" such as during typical non-business hours from about 5 pm to about 8 am when demand for the computer resources 112 may be expected to be relatively lower.

The usage application 116 of FIG. 1 may monitor the consumption per unit time of the computer resources 112 by an application 114 executed for a user 110 to determine whether consumption of the computer resources 112 remains at or below a corresponding upper limit 202, 204 or 206 included in a corresponding SLA with the user 110. In the event consumption exceeds the upper limit 202, 204, or 206, the usage application 116 may be configured to decrease the computer resources 112 allocated to the application 114 executed for the user 110 to ensure that consumption of the computer resources 112 remains at or below the corresponding upper limit 202, 204 or 206.

By imposing the upper limits 202, 204, 206 on the computer resources 112 that the application 114 executed for the user 110 can consume per unit time, the users 110 may be prevented from over-using the computer resources 112 to the detriment of other users 110. By imposing the upper limits 202, 204, 206 that vary with time where the upper limits 202, 204, 206 are relatively lower during the core business time and relatively higher during the economy time, the users 110 may be incentivized to shift their consumption of the computer resources 112 to typical non-business hours when demand for the computer resources 112 may be expected to be relatively lower.

Each of the upper limits 202, 204, 206 may refer to CPU peak performance. That is, each of the upper limits 202, 204, 206 may identify the peak CPU cycles per unit time, such as the peak CPU cycles per second, that is permitted under the first, second or third SLA.

Alternately or additionally, analogous time-varying upper limits having the same or similar curvature and periodicity as the upper limits 202, 204, 206 may be identified in the first, second or third SLA that refer to I/O peak performance. In these and other examples, each of the analogous upper limits referring to I/O peak performance may identify the peak I/O data amount per unit time, such as the peak I/O data amount per second, that is permitted under the first, second or third SLA, respectively.

In addition to identifying the upper limits 202, 204, 206, the first, second, and third SLAs may also identify a respective fixed cost per period, such as a fixed daily, weekly, or monthly cost that can be paid for consumption of the computer resources 112 up to the corresponding upper limit 202, 204, 206. By way of example only and not limitation, the cost identified in the first SLA corresponding to the upper limit 202 may be a first value, such as about $20 per month, while the cost identified in the second SLA corresponding to the upper limit 204 may be a second value higher than the first value, such as about $30 per month, and the cost identified in the third SLA corresponding to the upper limit 206 may be a third value higher than the second value, such as about $40 per month. More generally, the fixed periodic cost under an SLA with a first upper limit, such as the upper limit 202, may be less than the fixed periodic cost under an SLA with a second upper limit that is higher than the first upper limit, such as the upper limit 204 or 206. Charging a fixed periodic cost for usage of the computer resources 112 under an SLA may promote usage of the computer resources 112 since users 110 will not be concerned about increased fees with increased usage.

As in FIG. 2A, FIG. 2B also illustrates multiple upper limits 208, 210, 212. Each of the upper limits 208, 210, 212 may correspond to a respective SLA and may refer to CPU peak performance. Alternately or additionally, analogous time-varying upper limits having the same or similar curvature and periodicity as the upper limits 208, 210, 212 may be identified in the respective SLAs that refer to I/O peak performance.

In contrast to the upper limits 202, 204, 206 of FIG. 2A which have a period of 24 hours, the upper limits 208, 210, 212 of FIG. 2B have a period of one year. Moreover, each of the upper limits 208, 210, 212 of FIG. 2B is relatively lower during a first time of year corresponding to a corporate accounting period, and relatively higher during a second time of year different than the first time of year.

For example, in the United States, federal income taxes are typically due by April 15 of each year. As such, in the time leading up to April 15 each year, demand for the computer resources 112 may be expected to increase up until April 15, after which time demand may be expected to quickly decrease to a minimum. To prevent or decrease the likelihood that the computer resources 112 will be overused during the corresponding accounting period, the upper limits 208, 210, 212 during the accounting period when demand is expected to be relatively higher—e.g., from about January 1 through about April 30 in the example of FIG. 2B—may therefore be relatively lower during the accounting period than during the rest of the year—e.g., from about May 1 to about December 31—when demand for computer resources 112 is expected to be relatively lower.

The respective SLA that identifies each of the upper limits 208, 210, 212 may also identify a corresponding fixed cost per period that can be paid by or on behalf of a user 110 for consumption of the computer resources 112 up to the corresponding upper limit 208, 210, 212. The fixed cost per period identified in the SLA associated with the upper limit 208 may be relatively lower than the fixed cost per period identified in the SLA associated with the upper limit 210, and the fixed cost per period identified in the SLA associated with the upper limit 210 may be relatively lower than the fixed cost per period identified in the SLA associated with the upper limit 212.

While FIG. 2A illustrates the upper limits 202, 204, 206 each having a period of 24 hours, and FIG. 2B illustrates the upper limits 208, 210, 212 each having a period of one year, in other embodiments upper limits identified in SLAs may have different periods, such as, but not limited to, daily, weekly, monthly, semimonthly, bimonthly, quarterly, semi-annually, annually, biannually, or other periods. Alternately or additionally, more complicated upper limits can be identified in corresponding SLAs that combine two or more upper limits having different periods. For instance, one of the upper limits 202, 204, 206 of FIG. 2A could be added to or otherwise combined with one of the upper limits 208, 210, 212 of FIG. 2B to obtain an upper limit that generally varies on a daily basis as shown in FIG. 2A and that also has a daily average (or daily minimum or daily maximum, or the like) that varies on an annual basis as shown in FIG. 2B.

Figure 3:
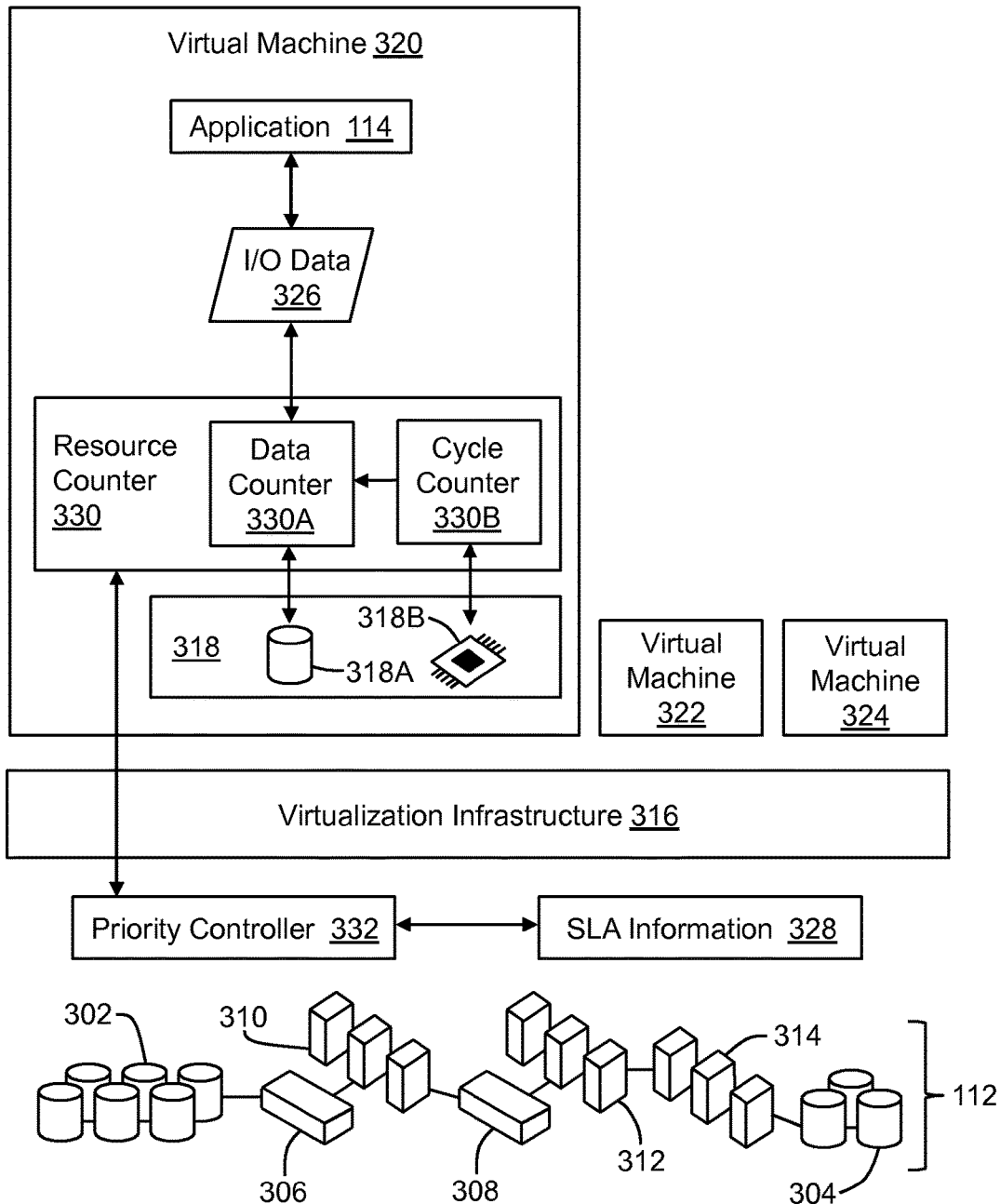
FIG. 3 is a block diagram of an example embodiment of a back end system of the cloud computing environment of FIG. 1.

FIG. 3 is a block diagram of an example embodiment of the back end system 106 of the cloud computing environment 100 of FIG. 1, arranged in accordance with at least some embodiments described herein. As shown in FIG. 3, the computer resources 112 of the back end system 106 may include storage devices 302, 304, networks and/or network devices 306, 308, and physical servers 310, 312, 314 or other computing devices. The storage devices 302, 304 may be implemented as primary storage within the computer resources 112 and may include nearly any type of storage device for digital data such as Random Access Memory (RAM), Read Only Memory (ROM), Electrically Erasable Programmable ROM (EEPROM), Compact Disc-ROM (CD-ROM) or other optical disk storage, magnetic disk storage, solid state storage or other storage devices. The networks and/or network devices 306, 308 may include one or more switches, routers, communication interfaces and/or other devices for facilitating communication between devices in the computer resources 112. The physical servers 310, 312, 314 may each include one or more CPUs and/or local storage devices. Accordingly, processing resources of the computer resources 112 may include, for instance, CPUs of the physical servers 310, 312, 314, and storage resources of the computer resources 112 may include the storage devices 302, 304 and/or local storage devices of the physical servers 310, 312, 314.

A virtualization infrastructure 316 may be provided upon the computer resources 112 to manage access to or "virtualize" the computer resources 112. In this regard, the virtualization infrastructure 316 may be configured to allocate virtualized resources 318 to a virtual machine 320, including virtual storage 318A and a virtual CPU 318B. The virtual machine 320 may be configured to execute the application 114 using the virtualized resources 318. The back end system 106 may include one or more additional virtual machines 322, 324 generally configured in the same manner as virtual machine 320. Although not shown, each virtual machine 320, 322, 324 may additionally include an operating system (OS) on which the application 114 is run.

The virtualization infrastructure 316 and virtual machines 320, 322, 324 may take any one of a number of forms to practice the embodiments disclosed herein. For example, the virtualization infrastructure 316 and virtual machines 320, 322, 324 may include, but are not limited to, VMware ESX, VMware GSX, Xen 3.0 (or other versions), or KVM.

The application 114 in virtual machine 320 may use the virtualized resources 318 to, for instance, read data into memory from storage, write data to storage from memory, and/or perform operations on data. Data including data written to storage and data read from storage is identified in FIG. 3 as I/O data 326.

The virtualized resources 318 may shield the application 114 from the actual computer resources 112, by presenting, for instance, the virtual storage 318A as a logical representation of all or a portion of one or more disk storage devices in the computer resources 112 to the application 114 and/or by allocating some or all of the CPU cycles of one or more CPUs in the computer resources 112 to the application 114 as virtual CPU 318B. While the virtual machine 320 is illustrated in FIG. 3 with a single application 114 running on the virtualized resources 318, in other embodiments, the virtual machine 320 may include a multiple number of applications 114 running on the virtualized resources 318.

With combined reference to FIGS. 1 and 3, the usage application 116 may include an SLA information module 328, a resource counter module 330 and a priority controller module 332, collectively referred to hereinafter as modules 328, 330, 332. Each of the modules 328, 330, 332 may include computer-executable instructions that are executable by a computing device or processing resource in the computer resources 112 to perform the operations described herein For example, the SLA information module 328 may be configured to store in at least one storage resource of the computer resources 112 an upper limit on the computer resources 112 that can be consumed per unit time by at least one application 114 executed for a user 110. In some embodiments, the SLA information module 328 stores multiple uppers limits identified in SLAs with multiple users 110. The upper limits may include one or more of the upper limits 202, 204, 206, 208, 210, 212 of FIGS. 2A-2B, for instance.

The resource counter module 330 may be configured to measure consumption of the computer resources 112, represented by the virtualized resources 318, by the at least one application 114 per unit time. In some embodiments, the resource counter module 330 measures consumption by intercepting communication between the at least one application 114 and the virtualized resources 318, including the virtual storage 318A and the virtual CPU 318B. Accordingly, the resource counter module 330 may include both a data counter 330A configured to measure the I/O data 326 per unit time between the application 114 and the virtual storage 318A, and a cycle counter 330B configured to measure CPU cycles per unit time of the virtual CPU 318B.

The priority controller module 332 may be communicatively coupled to the resource counter module 330 and to the SLA information module 328. Accordingly, the priority controller module 332 may be configured to determine whether consumption of the computer resources 112 by the at least one application 114 per unit time exceeds the upper limit by, e.g., comparing the measured consumption for the user 110 from the resource counter module 330 against the upper limit for the user 110 from the SLA information module 328, taking a current time into account when the upper limit varies with time.

Additionally, the priority controller module 332 may be configured to decrease allocation of the computer resources 112 to the at least one application 114 in response to determining that consumption by the at least one application 114 exceeds the upper limit. Alternately or additionally, the priority controller module 332 may be configured to increase allocation of the computer resources 112 to the at least one application 114 in response to determining that consumption by the at least one application 114 is below the upper limit.

The priority controller module 332 may decrease or increase allocation of the computer resources 112 in some embodiments by decreasing or increasing a priority level of the virtual machine 320. In these and other embodiments, the priority level of the virtual machine 320 may be associated with a frequency of allocation of the computer resources 112 to the virtual machine 320. Thus, by decreasing or increasing the priority level of the virtual machine 320, the computer resources 112 may be allocated with less or more frequency to the virtual machine 320 such that consumption per unit time of the computer resources 112 by the at least one application 114 may be reduced to below the upper limit or increased while still remaining below the upper limit.

By managing priority levels of the virtual machines 320, 322, 324 to decrease or increase allocation of the computer resources 112, upper limits can be imposed on the applications 114 executed for the users 110 without introducing machines of physically different types. Accordingly, a pricing scheme can be implemented in cloud computing environments such as the cloud computing environment 100 of FIG. 1 where a user 110 that pays a relatively higher charge for an SLA with a relatively higher upper limit is provided with a relatively higher allocation of computer resources 112 than a user 110 that pays a relatively lower charge for an SLA with a relatively lower upper limit.

Some embodiments disclosed herein may promote autonomous shifting of the consumption of the computer resources 112 to time periods, such as night-time or typical non-business periods, when the demand for computer resources may be low. For instance, as described with respect to FIGS. 2A-2B, the value of the upper limits 202, 204, 206 of FIG. 2A may be relatively higher during the evening and night-time, which may incentivize the users 110 to plan accordingly to shift consumption of the computer resources 112 from the core business time or normal business hours to economy time including the evening and night-time. Analogously, the value of the upper limits 208, 210, 212 of FIG. 2B is relatively higher during a less busy business period of a year from about May through December, which may incentivize the users 110 to plan accordingly to shift consumption of the computer resources 112 that might otherwise occur during the corporate accounting period from January through April to the less busy business period of the year.

Alternately or additionally, some of the embodiments disclosed herein may promote a transition to cloud computing by users 110 that might otherwise be reluctant or unwilling to make the transition. For instance, whereas some pricing schemes for cloud computing are usage-based, it may be difficult or impossible for some users 110 under such pricing schemes to predict and budget for the amount of fees that will be incurred during any given period for cloud computing services, which in turn may dissuade the users 110 from transitioning to cloud computing. According to the present disclosure, however, the users 110 may be charged a fixed periodic cost for cloud computing and may, therefore, budget accordingly with a high degree of certainty.

Some of the disclosed embodiments may provide a pricing model that is fair to users 110 that have high consumption rates and to users 110 that have low consumption rates. In particular, the users 110 can pay higher fees to accommodate higher consumption rates or lower fees to accommodate lower consumption rates.

Some of the disclosed embodiments can be implemented in existing cloud computing environments by provisioning the cloud computing environments with the usage application 116, including the modules 328, 330, 332. Thus, some of the disclosed embodiments can be implemented in existing cloud computing environments without replacing any existing software or hardware in the cloud computing environments.

Figure 4:
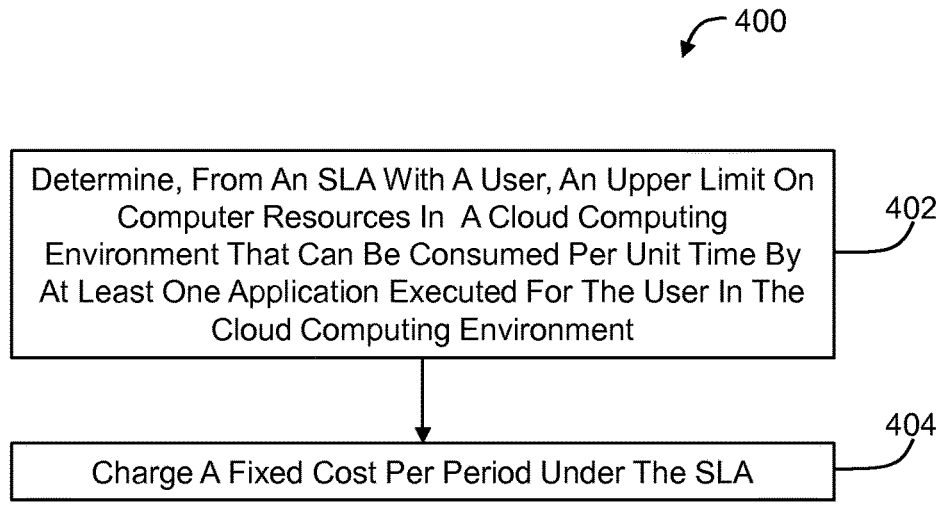
FIG. 4 shows an example flow diagram of a method that can be implemented in the cloud computing environment of FIG. 1.

FIG. 4 shows an example flow diagram of a method 400 that can be implemented in the cloud computing environment 100 of FIG. 1, arranged in accordance with at least some embodiments described herein. The method 400 may be performed in whole or in part by, e.g., the computer resources 112 within the back end system 106 of FIG. 1 or 3. The method 400 includes various operations, functions or actions as illustrated by one or more of blocks 402 and/or 404. The method 400 may begin at block 402.

In block 402, a computing device determines, from an SLA with a user, an upper limit on computer resources in a cloud computing environment that can be consumed per unit time by at least one application executed for the user in the cloud computing environment. The computing device may include a CPU within the computer resources 112 of FIG. 3, such as a CPU of one of the physical servers 310, 312, 314 of FIG. 3. Determining the upper limit from the SLA with the user may be performed by the priority controller module 332 of FIG. 3 looking the upper limit up in the SLA information module 328 of FIG. 3. The upper limit may vary with time, as described above with respect to FIGS. 2A-2B. Block 402 may be followed by block 404.

In block 404, a fixed cost per period is charged under the SLA. The fixed cost may be, for example, a fixed monthly cost and may be charged to the user, such as one of the users 110 of FIG. 1.

Some embodiments disclosed herein include a computer storage medium having computer-executable instructions stored thereon that are executable by the computing device to perform operations included in the method 400 of FIG. 4, such as the operations illustrated by blocks 402 and/or 404 in FIG. 4, and/or variations thereof. The computer storage medium may be included in one or more of the storage devices 302, 304 of FIG. 3 and/or in one or more local storage devices of the physical servers 310, 312, 314 of FIG. 3.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 400 may further include estimating an amount of the computer resources to satisfy the SLA, and determining the fixed cost according to the estimated amount of the computer resources compared to a total available amount of the computer resources. In these and other embodiments, the fixed cost may be relatively high if the estimated amount of the computer resources is relatively high and/or if the total available amount of the computer resources is relatively low compared to the estimated amount.

Alternately or additionally, the method 400 may further include measuring consumption of the computer resources by the at least one application per unit time, determining that consumption of the computer resources by the at least one application per unit time exceeds the upper limit, and, in response to the determination, decreasing allocation of the computer resources to the at least one application. Although not required, one or more of the foregoing steps may be performed by the usage application 116 of FIG. 1, including one or more of the SLA information module 328, resource counter module 330 and/or priority controller module 332 of FIG. 3.

In these and other embodiments, decreasing allocation of the computer resources to the at least one application may include decreasing a priority level of a virtual machine executing the at least one application in the cloud computing environment. For example, the priority controller module 332 of FIG. 3 may decrease allocation of computer resources 112 to the application 114 by decreasing a priority level of the virtual machine 320 executing the application 114.

Alternately or additionally, the measured consumption per unit time may include at least one of CPU cycles per unit time, or I/O data amount per unit time.

In some embodiments, the upper limit specified in the SLA of a particular user may be insufficient for the desires of the user. For instance, the user may infrequently or as a one-time event desire to execute an application either more quickly and/or that requires more computer resources than would otherwise be possible under the upper limit specified in the SLA of the user. In these and other embodiments, the user may indicate, e.g., through a user interface (UI), that the user desires to exceed the upper limit.

Accordingly, the method 400 may further include receiving a request to increase the computer resources that can be consumed by the at least one application per unit time to exceed the upper limit. While the at least one application is being executed for the user in the cloud computing environment, the SLA may be migrated to a different SLA having a different relatively higher upper limit. Additionally, a different relatively higher fixed cost per period can be charged under the different SLA after migrating the SLA to the different SLA.

Alternately or additionally, the method 400 may further include receiving a request to increase the computer resources that can be consumed by the at least one application per unit time. Computer resources in excess of the upper limit may be allocated for execution of the at least one application. A usage based fee for consumption of the computer resources that exceeds the upper limit can be charged to, e.g., the user.

Figure 5:
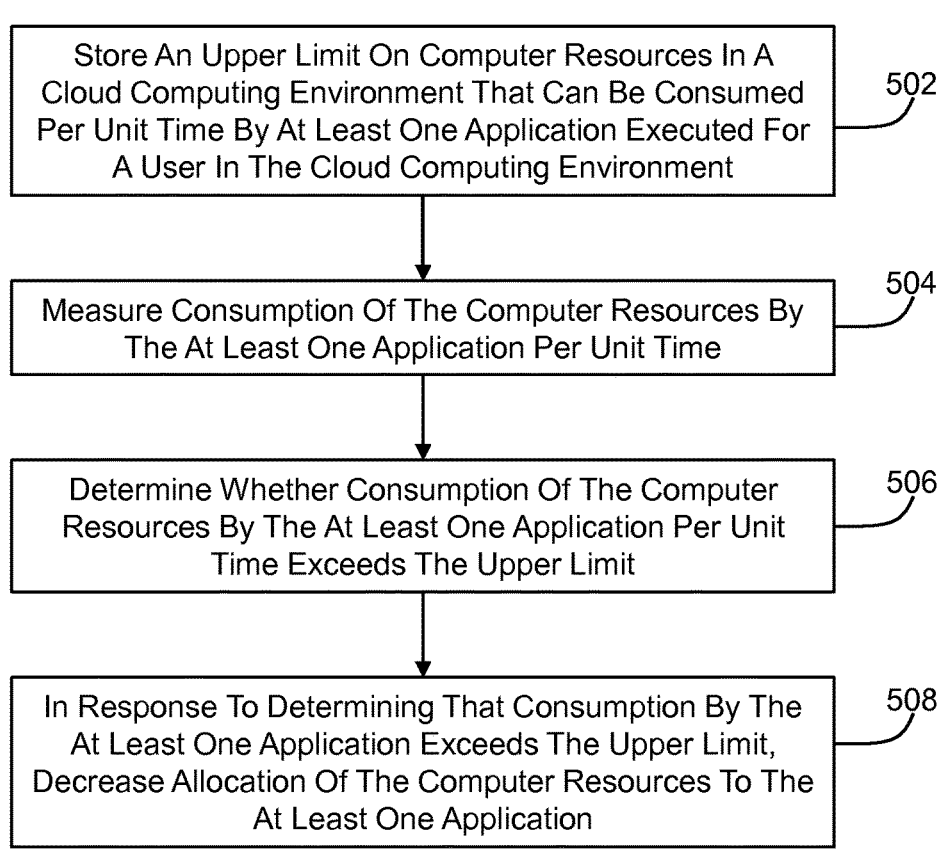
FIG. 5 shows an example flow diagram of another method that can be implemented in the cloud computing environment of FIG. 1.

FIG. 5 shows an example flow diagram of another method 500 that can be implemented in the cloud computing environment of FIG. 1, arranged in accordance with at least some embodiments described herein. The method 500 may be performed in whole or in part by, e.g., the computer resources 112 within the back end system 106 of FIG. 1 or 3. For example, the method 500 may be performed in whole or in part by executing the usage application 116 of FIG. 1, including the modules 328, 330, 332 of FIG. 3, on some of the computer resources 112. The method 500 includes various operations, functions, or actions as illustrated by one or more of blocks 502, 504, 506 and/or 508. The method 500 may begin at block 502.

In block 502, an upper limit on computer resources in a cloud computing environment that can be consumed per unit time by at least one application executed for a user in the cloud computing environment is stored. The upper limit may be stored by, e.g., the SLA information module 328 of FIG. 3 with an SLA and/or may be stored in one of the storage devices 302, 304 of FIG. 3 or in a local storage device included in one of the physical servers 310, 312, 314. Block 502 may be followed by block 504.

In block 504, consumption of the computer resources by the at least one application per unit time is measured. The consumption of the computer resources may be measured by, e.g., the resource counter module 330 of FIG. 3. Block 504 may be followed by block 506.

In block 506, it is determined whether consumption of the computer resources by the at least one application per unit time exceeds the upper limit. Whether consumption exceeds the upper limit may be determined by, e.g., the priority controller module 332 of FIG. 3. The determination may include comparing measured consumption, e.g., from the resource counter module 330 of FIG. 3, against the upper limit, e.g., from the SLA information module 328. Block 506 may be followed by block 508.

In block 508, in response to determining that consumption by the at least one application exceeds the upper limit, allocation of the computer resources to the at least one application is decreased. Allocation of the computer resources may be decreased by, e.g., the priority controller module 332 of FIG. 3.

Alternately or additionally, decreasing allocation of the computer resources to the at least one application may include decreasing a priority level of a virtual machine executing the at least one application in the cloud computing environment. For instance, the priority controller module 332 of FIG. 3 may decrease a priority level of the virtual machine 320 of FIG. 3 that executes the application 114 to decrease the allocation of computer resources 112 to the application 114.

Figure 6:
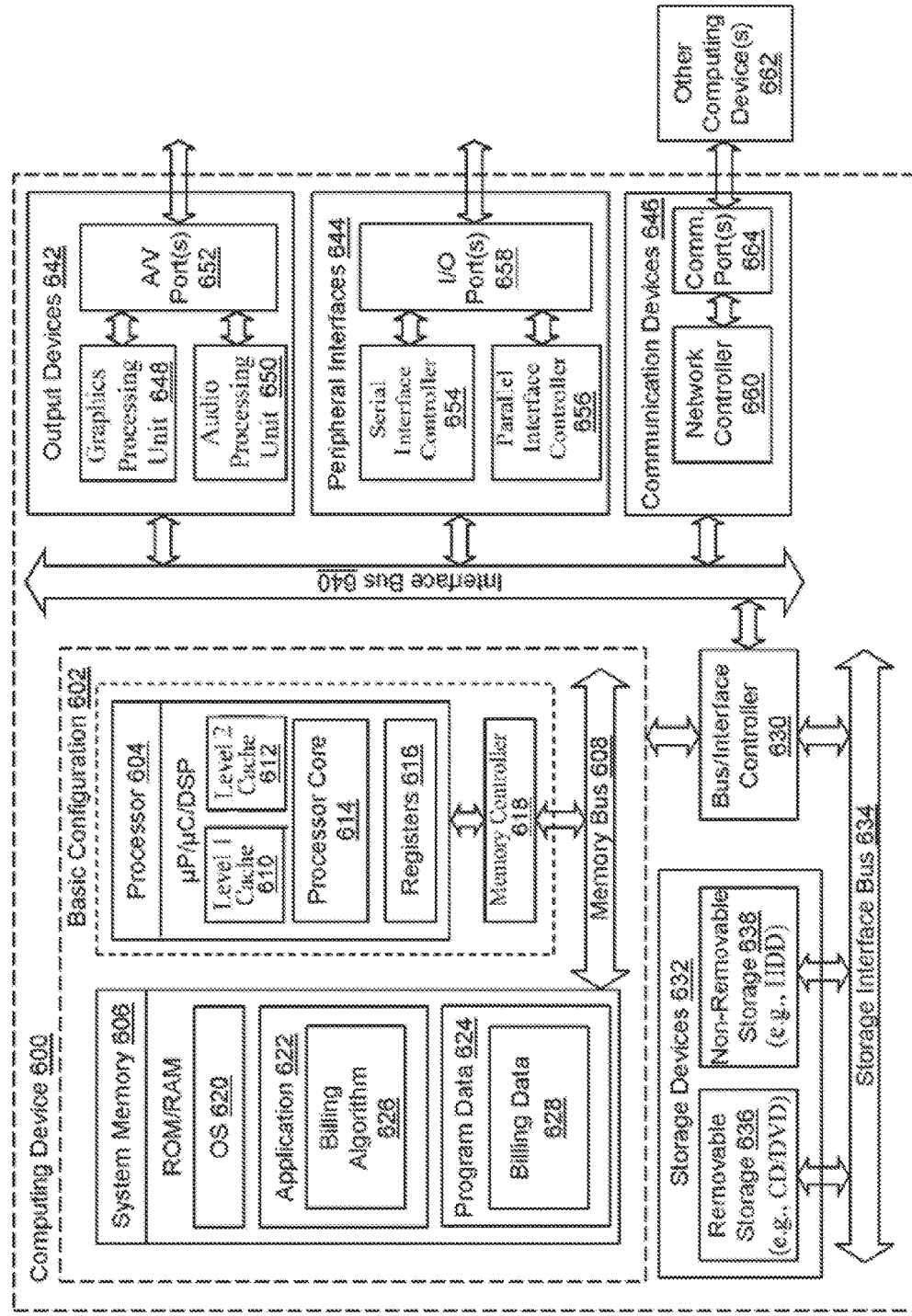
FIG. 6 is a block diagram illustrating an example computing device that is arranged for peak-performance-aware billing, all arranged in accordance with at least some embodiments described herein.

FIG. 6 is a block diagram illustrating an example computing device 600 that is arranged for peak-performance-aware billing arranged in accordance with at least some embodiments described herein. The computing device 600 may be included in the computer resources 112 of FIGS. 1 and 3, for example. In a very basic configuration 602, the computing device 600 typically includes one or more processors 604 and a system memory 606. A memory bus 608 may be used for communicating between the processor 604 and the system memory 606.

Depending on the desired configuration, the processor 604 may be of any type including but not limited to a microprocessor (μP), a microcontroller (μC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an OS 620, one or more applications 622, and program data 624. The application 622 may include a billing algorithm 626 that is arranged to perform the functions as described herein including those described with respect to the methods 400 and 500 of FIGS. 4 and 5. The application 622 may correspond to the usage application 116 of FIG. 1, for example. The program data 624 may include billing data 628 that may be useful for configuring the billing algorithm 626 as is described herein. For instance, the billing data 628 may include upper limit(s) retrieved from SLA information module 328 of FIG. 3 and/or measured consumption received from the resource counter module 330 of FIG. 3. In some embodiments, the application 622 may be arranged to operate with the program data 624 on the OS 620 such that implementations of billing methods such as methods 400 and 500 of FIGS. 4 and 5 may be provided as described herein. This described basic configuration 602 is illustrated in FIG. 6 by those components within the inner dashed line.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to implement a service level agreement (SLA) based flat rate pricing for a cloud computing environment, the method comprising:
 determining, by a computing device from the SLA with a user, an upper limit on computer resources in the cloud computing environment that can be consumed per unit time by at least one application executed for the user in the cloud computing environment,
 wherein the upper limit varies with time of day or year;
 charging a fixed cost per period under the SLA;
 measuring consumption of the computer resources by the at least one application per unit time,
 wherein the at least one application is permitted to consume any amount of the computer resources per unit time below the upper limit at the charged fixed cost in accordance with the SLA based flat rate pricing;
 determining that the consumption of the computer resources, by the at least one application per unit time, exceeds the upper limit; and
 in response to the determination that the consumption of the computer resources, by the at least one application per unit time, exceeds the upper limit, decreasing allocation of the computer resources to the at least one application,
 wherein decreasing the allocation of the computer resources to the at least one application comprises decreasing a priority level of a virtual machine that executes the at least one application in the cloud computing environment.

2. The method of claim 1, further comprising:
 estimating an amount of the computer resources to satisfy the SLA; and
 determining the fixed cost in accordance with the estimated amount of the computer resources compared to a total available amount of the computer resources.

3. The method of claim 1, wherein the computer resources include at least one processing resource and at least one storage resource.

4. The method of claim 1, wherein the measured consumption of the computer resources by the at least one application per unit time includes at least one of central processing unit (CPU) cycles per unit time and input/output (I/O) data amount per unit time.

5. The method of claim 1, wherein the upper limit varies between a first value at a first time of day and a second value at a second time of day, and wherein the first value is lower than the second value.

6. The method of claim 5, wherein the first time of day is included in a core business time during daytime, and the second time of day is included in an economy time during nighttime.

7. The method of claim 1, wherein the upper limit during a first time of year that corresponds to a corporate accounting period is relatively lower than during a second time of year.

8. The method of claim 1, wherein the SLA comprises a first SLA, the upper limit comprises a first upper limit, and the fixed cost comprises a first fixed cost, the method further comprising:
 receiving a request to increase the computer resources that can be consumed by the at least one application per unit time;
 while the at least one application is being executed for the user in the cloud computing environment, migrating from the first SLA to a second SLA having a second upper limit that is higher than the first upper limit; and
 charging a second fixed cost per period under the second SLA, wherein the second fixed cost is higher than the first fixed cost.

9. The method of claim 1, further comprising:
 receiving a request to increase the computer resources that can be consumed by the at least one application per unit time;
 allocating the computer resources in excess of the upper limit for execution of the at least one application; and
 charging a usage based fee for the consumption of the computer resources that exceed the upper limit.

10. A computer storage medium having computer-executable instructions stored thereon that are executable by a computing device to perform or control performance of operations to implement a service level agreement (SLA) based flat rate pricing for a cloud computing environment, the operations comprising:
 storing an upper limit on computer resources in the cloud computing environment that can be consumed per unit time by at least one application executed for a user in the cloud computing environment, wherein the upper limit varies with time of day or year;
 measuring consumption of the computer resources by the at least one application per unit time;
 determining whether the consumption of the computer resources by the at least one application per unit time exceeds the upper limit; and
 in response to a determination that the consumption, by the at least one application, exceeds the upper limit, decreasing allocation of the computer resources to the at least one application, wherein the decreasing the allocation of the computer resources comprises decreasing a priority level of a virtual machine that executes the at least one application in the cloud computing environment.

11. The computer storage medium of claim 10, wherein the upper limit varies between a first value at a first time of day and a second value at a second time of day, and wherein the first value is lower than the second value.

12. The computer storage medium of claim 11, wherein the first time of day is included in a core business time during daytime, and the second time of day is included in an economy time during nighttime.

13. The computer storage medium of claim 10, wherein the upper limit during a first time of year that corresponds to a corporate accounting period is relatively lower than during a second time of year.

14. The computer storage medium of claim 10, wherein the computer resources include at least one central processing unit (CPU) and at least one storage device.

15. The computer storage medium of claim 14, wherein the measured consumption per unit time includes at least one of central processing unit (CPU) cycles per unit time and input/output (I/O) data amount per unit time.

16. A back end system of a cloud computing environment to implement a service level agreement (SLA) based flat rate pricing for the cloud computing environment, the back end system comprising:
- an SLA information module that comprises computer-executable instructions that are executable by at least one processing resource to store, in at least one storage resource, an upper limit on computer resources that can be consumed per unit time by at least one application executed for a user in the cloud computing environment;
- a resource counter module that comprises computer-executable instructions that are executable by the at least one processing resource to measure consumption of the computer resources by the at least one application per unit time;
- a priority controller module that comprises computer-executable instructions that are executable by the at least one processing resource to:
  - determine whether the consumption of the computer resources by the at least one application per unit time exceeds the upper limit; and
  - in response to a determination that the consumption by the at least one application exceeds the upper limit, decreasing allocation of the computer resources to the at least one application; and
- a virtual machine to execute the at least one application by use of virtualized resources allocated from the computer resources, wherein:
- the upper limit varies with time of day or year,
- a priority level of the virtual machine determines a frequency of allocation of the computer resources to the virtual machine for the execution of the at least one application, and
- the priority controller module is configured to decrease the allocation of the computer resources to the at least one application by a decrease of the priority level of the virtual machine.

17. The back end system of claim 16, further comprising the computer resources that include the at least one processing resource and the at least one storage resource.

18. The back end system of claim 16, wherein the virtual machine comprises VMware ESX, VMware GSX, XEN 3.0, or KVM.

* * * * *